A. M. KENNEDY.
METHOD AND APPARATUS FOR BALANCING ROTORS.
APPLICATION FILED JUNE 2, 1919.

1,319,928.

Patented Oct. 28, 1919.

Witnesses

Inventor
Absalom M. Kennedy

UNITED STATES PATENT OFFICE.

ABSALOM M. KENNEDY, OF CLOVERDALE, ALABAMA.

METHOD AND APPARATUS FOR BALANCING ROTORS.

1,319,928.  Specification of Letters Patent. Patented Oct. 28, 1919.

Application filed June 2, 1919. Serial No. 301,153.

*To all whom it may concern:*

Be it known that I, ABSALOM M. KENNEDY, a citizen of the United States, and a resident of the town of Cloverdale, county of Montgomery, State of Alabama, have invented certain new and useful Improvements in Methods and Apparatus for Balancing Rotors, of which this is a specification, reference being had to the accompanying drawing, forming part hereof.

The invention relates to the balancing of such machine parts as pulleys, fly-wheels, armatures, crank-shafts, turbine rotors, and like elements intended to be rapidly rotated and in which it is desirable to have as nearly as possible perfect balance or uniform distribution of mass around the axis of rotation. The object of the invention is to provide novel, simple, inexpensive, efficient and precise methods and apparatus to effect such balancing by altering the mass at suitable points so that a perfect balance can be closely approximated or even reached.

I attain the objects of the invention to a remarkable extent by the method and means illustrated; the method consisting broadly in spinning the object on an axis flexible enough to permit the object to describe a surface of revolution on an axis of its own selection and bringing the surface of the body where it coincides with the surface of revolution in resilient contact with an electrolyte embraced with the object in a suitable circuit so that the mass of the body is altered electrolytically at the precise points where alteration is needed.

Figure 1:
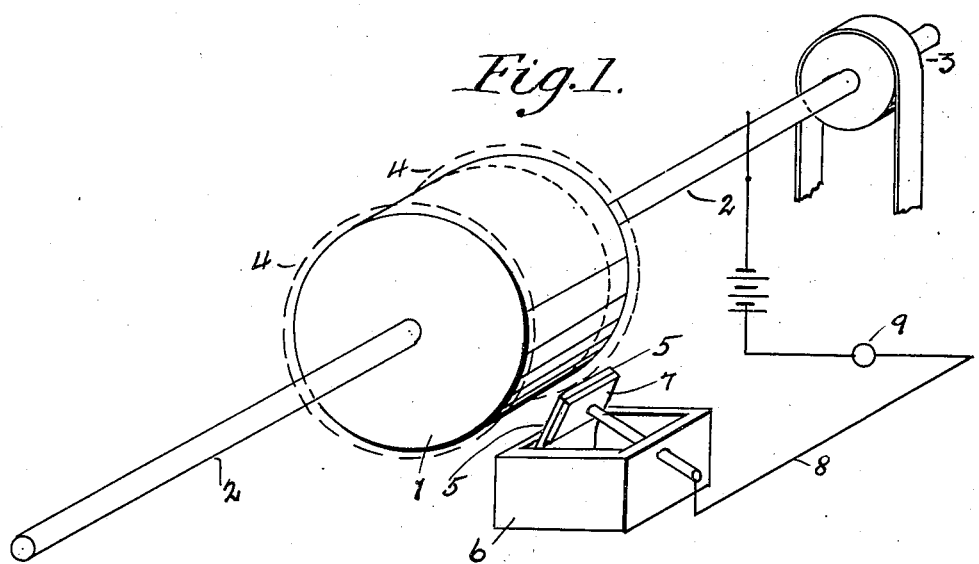
Figure 2:
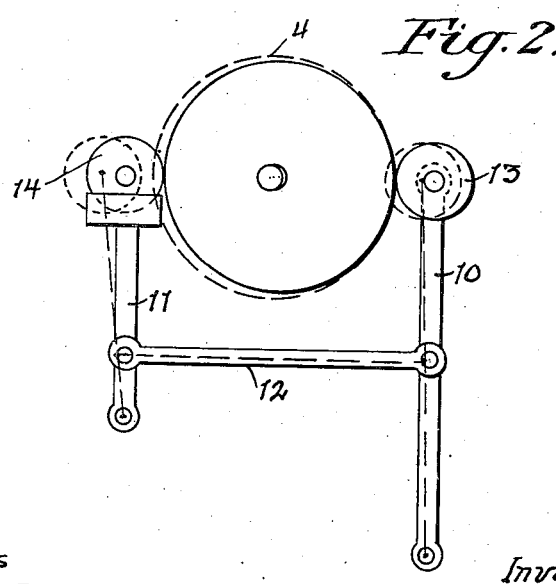

The drawing illustrates the elements of the invention both as a method and an apparatus—Figure 1 showing the removal of material while Fig. 2 shows the agencies for adding to the mass.

In the drawing the object 1, here a disk or short cylinder, (but which may be a shuttle-armature, toothed armature, multiple crank shaft, turbine rotor, or other machine part intended to be rapidly rotated and hence requiring accurate balance) is shown mounted on a shaft 2, sufficiently long and resilient as to permit the object to select its own axis of rotation when driven at sufficient speed by suitable driving means as at 3. At speed the object, presupposing it unbalanced, will select its axis of rotation and describe a surface of revolution shown, very much exaggerated, by the dotted circles 4, 4. This surface is that described by the part of the body farther from the axis of rotation, and the surface of this part of the body coincides with the surface of revolution, successively occupying all areas of this surface. At some suitable point I provide an electrolyte, most conveniently carried by a wick as at 5 kept moist by dipping in a container 6 holding a supply of electrolyte, and an electrode 7 in contact with the electrolyte and embraced with it and the rotating body in a suitable electric circuit such as at 8. The electrolyte at 5 is adjustably supported so that it can be advanced toward the axis of rotation as the surface of revolution diminishes in diameter and preferably, though not necessarily, the electrode 7 should be adjustable with it and serve as a carrier for the wick. The adjustable electrolyte is held in resilient contact with the surface of the rotor where it coincides with the surface of revolution; the contact not being sufficient to appreciably distort the form of the surface of revolution. It is entirely obvious that a still more resilient or yielding contact could be had between the rotating body and the electrolyte by permitting the electrolyte to flow as a stream down the face of the electrode 7 and permit the rotating body to contact with this stream each time its most outstanding surface came around. The engagement with a textile carrier, or wick, however, is so resilient that it will ordinarily never be necessary to employ a more yielding contact than it affords, particularly as a freely swung end of the wick can be employed as the contact if it is desired—the arrangement being perfectly obvious. It will be seen that by this method and apparatus the mass of the rotor is progressively altered and altered in the very parts which require alteration; the surface of revolution becoming of shorter and shorter radius until it coincides with the surface of revolution of the body with a rectilinear axis—the condition in this case of balance. The electrolyte, obviously, is a solution of a salt of the metal of the rotor but I prefer to employ aluminum as the electrode 7 so as to permit easy stripping of deposits which are made on it. The system, of course, presupposes a progressive advancing of the electrolyte contact toward the flexible shaft and this can be conveniently governed by the electric circuit, a typical means being a small incandescent lamp in series with the circuit as at 9 which intermittently lights every rotation so long as the electrolyte makes periodic contact and remains dark when the surface of revolution is worn down so much that contact is lost.

Of course where the object is imperforate or already has a shaft of its own, as in the case of a crank shaft, the flexible shaft cannot be introduced through it as shown but must be, obviously, in two portions, suitably connected to the rotor and being extensions of its own shaft.

In balancing rotors where it is undesirable to alter the true cylindrical surface, as for example on turbine rotors, the surface modification can be confined to annular portions at the ends as shown in the figure. This will involve taking off more metal, or rather to a greater radial distance, but will leave the cylinder between the end rings undistorted in form.

Where it is desired to add metal to the rotor I may employ the simple device shown in Fig. 2, where by levers of different length as 10, 11, connected by a link 12, movement of lever 10 to the right by the idler roller 13 taking the surface of revolution will draw the electrolyte wick temporarily up against the opposite side of the rotor, in this case the cathode of the circuit, and with the anode of the same metal, ordinarily. For convenience the wick 14 of Fig. 2 is shown as a porous roller dipping in a bath of the electrolyte—this being merely one of the many obvious arrangements.

Having described my invention, what I claim is:—

1. The method described, consisting in rotating the body to be balanced on a flexible shaft at a speed sufficient to cause it to select its own axis of rotation and describe a surface of revolution and electrolytically altering the mass of the body at points governed by the coincidence of the actual surface of the body with the surface of revolution, substantially as set forth.

2. The method described, consisting in rotating the body to be balanced under such conditions that it can select and rotate about its own axis of rotation and describe a surface of revolution larger than its own surface and while so rotated embracing the body by resilient contact with an electrolyte in an electrolytic circuit, substantially as set forth.

3. The method described, consisting in rotating the body to be balanced under such conditions that it can select and rotate about its own axis of rotation and describe a surface of revolution, and while so rotated embracing the body as the anode of an electrolytic circuit by bringing that part of its surface which coincides with the surface of revolution in resilient contact with an electrolyte in said circuit.

4. The method described, consisting in rotating the body to be balanced under such conditions that it can select and rotate about its own axis of rotation and describe a surface of revolution, and while so rotated embracing the body as the cathode of an electrolytic circuit by bringing a part of its surface diametrically opposite that part which coincides with the surface of revolution in resilient contact with an elestrolyte in said circuit.

5. In apparatus of the class described, the combination with the body to be balanced of a flexible shaft arranged to be rotated with said body and permit it to take its own axis of rotation, an electrolyte arranged to be intermittently in resilient contact with said rotating body, and an electric circuit embracing said rotating body and said electrolyte, substantially as set forth.

6. In apparatus of the class described, the combination with the body to be balanced, of a flexible shaft on which said body can be rotated, an electric circuit, and an electrolyte in resilient contact with said body and embraced with it in said circuit.

7. In apparatus of the class described, the combination with the body to be balanced, means arranged to rapidly rotate said body on a flexible shaft, an electric circuit, an electrolyte in more or less complete contact with said body, and embraced with said body in circuit.

8. In apparatus of the class described, the combination with the body to be balanced, of means arranged to rotate said body around an axis of its own selection, an electrolytic circuit, the electrolyte of said cicuit in variable contact with said body, and said body embraced in said circuit as an electrode.

9. The method described, consisting in rotating the body to be balanced around an axis of its own selection and while it is so rotating electrolytically altering its mass until the same is approximately uniformly distributed about its axis of figure.

In witness whereof I have hereunto set my hand this May 27, 1919.

ABSALOM M. KENNEDY.

In the presence of—
 GEORGE A. DENNIS,
 JAMES E. DOWE.